United States Patent [19]

Karakawa

[11] Patent Number: 4,830,061
[45] Date of Patent: May 16, 1989

[54] PLASTICS COVER FOR PIPING
[75] Inventor: Kazuo Karakawa, Koga, Japan
[73] Assignee: Yamato Kogyo Kabushiki Kaisha, Ibaraki, Japan
[21] Appl. No.: 152,551
[22] Filed: Feb. 5, 1988
[30] Foreign Application Priority Data Feb. 9, 1987 [JP] Japan .............................. 62-17547[U]

[51] Int. Cl.⁴ .............................................. F16L 11/12
[52] U.S. Cl. .................................... 138/168; 138/110; 138/120; 138/128; 138/149; 138/166; 285/423
[58] Field of Search .................. 138/97, 99, 103, 110, 138/128, 156, 157, 158, 162, 163, 165, 166, 168, 151, 149, 120, 155, 169, 178; 285/18, 24, 27, 45, 47, 65, 260, 328, 423; 428/192

[56] References Cited

U.S. PATENT DOCUMENTS

| 2,825,673 | 3/1958 | Tschappu | 138/168 |
| 3,517,702 | 6/1970 | Mueller et al. | 138/166 |
| 3,846,575 | 11/1974 | Troy | 138/168 |
| 4,015,072 | 3/1977 | Gillemot | 138/166 |
| 4,379,473 | 4/1983 | Kunze | 138/128 |
| 4,535,197 | 8/1985 | Butler | 138/166 |

FOREIGN PATENT DOCUMENTS

| 2900796 | 7/1980 | Fed. Rep. of Germany | 138/166 |
| 488547 | 7/1938 | United Kingdom | 138/156 |

Primary Examiner—James E. Bryant, III
Attorney, Agent, or Firm—Oblon, Fisher, Spivak, McClelland & Maier

[57] ABSTRACT

A plastics cover for a piping which comprises a plastics cover body of a wide strip-like shape and a substantially T-shaped rib arranged on one side edge of the cover body. The rib includes a leg portion connected to the cover body and a wing portion, so that an inner groove and an outer groove is defined between the wing portion and the cover body. Mounting of the cover on a pipe is carried out by interengaging a first engagement projection on the inner surface of the wing portion and a second engagement projection on the outer surface of the other side edge of the cover body.

4 Claims, 5 Drawing Sheets

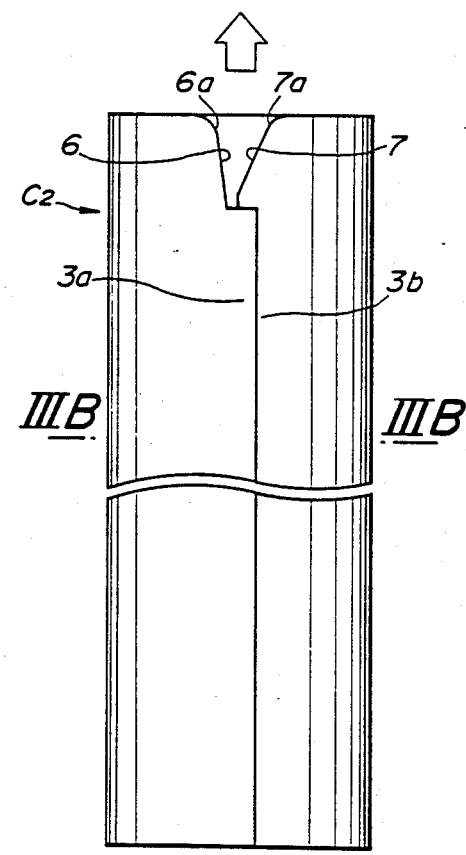
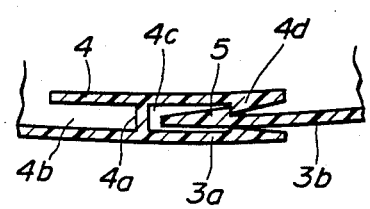

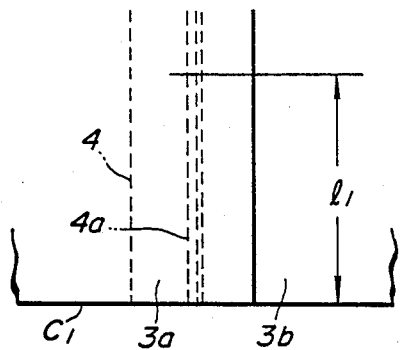
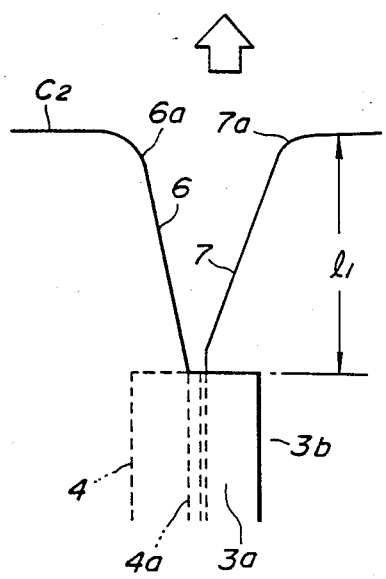
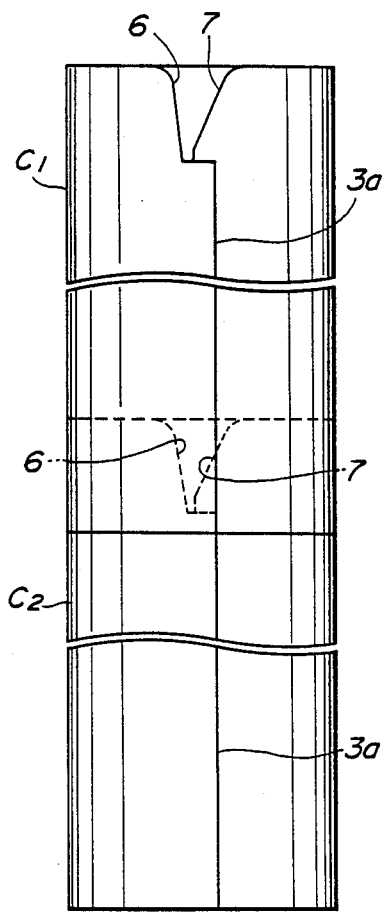

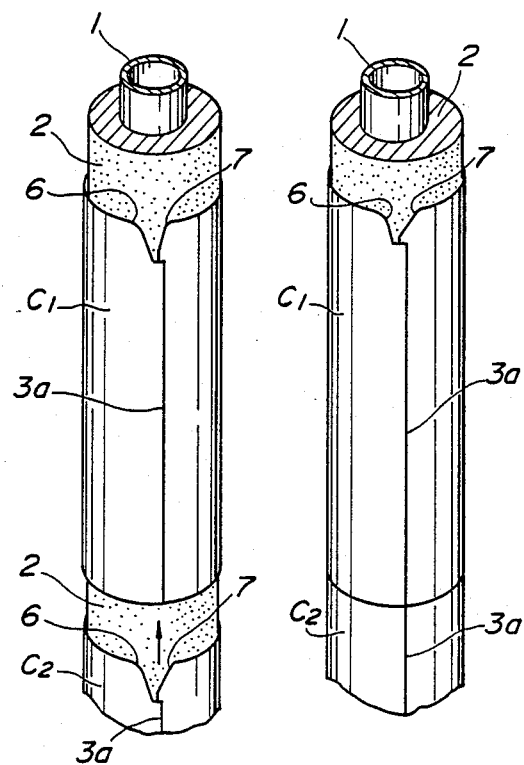

PLASTICS COVER FOR PIPING

BACKGROUND OF THE INVENTION

1. Field of the Invention

The present invention relates to a plastics cover for piping, and more particularly, to such a cover made not of metal sheet but of a plastics material. The cover may protectively cover the outside of a heat insulating material provided on an outer surface of a pipe e.g. for indoor air-conditioning piping typically inside a building.

2. Description of the Prior Art

For the purpose of covering a pipe for indoor piping, metal sheet covers have been substituted for the wide tapes which in the past have been spirally wound around pipes. However, it has been found that metal sheet pipe covers are unsuitable for covering indoor piping because they fail to exhibit a satisfactory finished appearance. For this reason, covers made of plastics material have been extensively used.

Unfortunately, the conventional plastics cover is not constructed in such a manner that its side edges may be simply and readily engaged with each other when it is wound on the pipe. Thus, the conventional plastics cover is formed by winding a thin or thick plastics sheet of rectangular or strip-like shape, which has a width corresponding to the circumference of a pipe, on the outer surface of the covering material mounted around the pipe, and then fixing the cover on the pipe using suitable means such as a tape, a band or the like.

Accordingly, mounting a conventional plastics cover on a pipe requires considerable labour and time because the fixing of the cover on the pipe by a tape of the like must be carried out while holding the cover by hand. As a result, the operation is highly troublesome and so the conventional plastics cover reduces the efficiency of the operation and fails to produce a good finished appearance.

Furthermore, connection between adjacent plastics covers is carried out by winding a tape on a circumferential joint between the two covers while their ends abut or overlap. This also requires much labor and time and fails to give a good finished appearance. It is also particularly difficult to connect adjacent covers in such a way as to align their edges in a longitudinal direction.

SUMMARY OF THE INVENTION

The present invention has been made in view of the foregoing disadvantages of the prior art.

Accordingly, it is an object of the present invention to provide a plastics cover for piping which is capable of secure fitting and mounting on a pipe both simply and readily.

It is another object of the present invention to provide a plastics cover for piping in which relative rotation of adjacent covers is avoided while connection between the covers is achieved, resulting in the respective longitudinal edges of the covers being properly aligned with one another.

It is a further object of the present invention to provide a plastics cover for piping which exhibits a good finished appearance.

According to the invention, there is provided a cover for piping comprising: a cover body made of a plastics material and having a wide strip-like shape when it is in a flattened or non-folded configuration; a rib extending along one side edge of the cover body in the longitudinal direction of the cover body, the rib comprising a leg portion which has one end connected to the cover body and a wing portion mounted on the other end of the leg portion so as to extend laterally outwards from the leg portion, thereby defining an outer groove between the wing portion of the rib and the cover body; a first engagement means provided on the inner surface of the wing portion so as to be positioned in the outer groove; and a second engagement means provided on the outer surface of the other side edge of the cover body, the first and second engagement means being engageable whereby engagement between the first and second engagement means causes the cover body to form a cylinder.

Preferably, the rib portion is substantially T-shaped in cross-section and the wing portion additionally extends laterally inward from the leg portion to define an inner groove so that the inner and outer grooves are opposite to each other with the leg portion interposed between them.

Preferably, the cover body is formed by forming the plastics material into a continuous blank and cutting the blank into sheets of a predetermined length.

Preferably, one side edge of the cover body is cut downwardly at its upper portion through a predetermined distance to an inner position beyond the rib to form a first engagement region serving as a fitting guide and a rotation stop, and the other side edge of the cover body is cut downwardly at its upper portion through the same distance to an inner position beyond the engagement projection to form a second engagement region serving as both a fitting guide and a rotation stop. Preferably, the cut at the one side edge and the cut at the other side edge each extend down from a respective curved portion.

BRIEF DESCRIPTION OF THE DRAWINGS

Other objects and many of the attendant advantages of the present invention will be readily appreciated as the same become better understood by reference to the following detailed description when considered in connection with the accompanying drawings, wherein:

FIG. 3A is a front elevation showing the plastics cover of FIG. 1 as mounted on a pipe;

FIG. 3B is a fragmentary enlarged sectional view taken along line IIIB—IIIB of FIG. 3A;

FIG. 4 is a fragmentary enlarged front elevation showing two vertically adjacent plastics covers to be connected;

FIG. 5 is a front elevation showing the connection between the two plastics covers of FIG. 4;

FIG. 6B is a sectional view taken along line VIB—VIB of FIG. 6a;

FIG. 7A is a perspective view showing the plastics cover mounted and fitted on an insulating material arranged on a pipe; and FIG. 7B is a perspective view showing the connection between two plastics covers which have been fitted on a pipe.

DESCRIPTION OF THE PREFERRED EMBODIMENTS

Figure 1A:
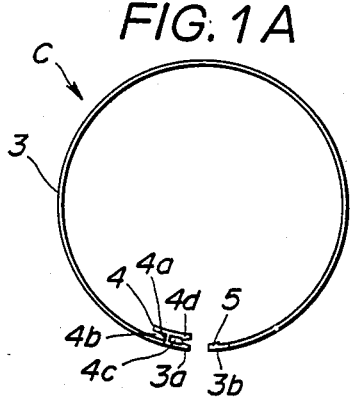
FIG. 1A is a plan view showing a plastics cover for piping according to the present invention.

The invention may be carried into practice in various ways and some embodiments will now be described by way of example with reference to the accompanying drawings.

FIGS. 1 to 7 show an embodiment of a plastics cover according to the present invention. The plastics cover of the illustrated embodiment is generally designated by reference character C. The cover C includes a cover body 3 of a predetermined length which has a wide strip-like shape when it is developed or opened out. The cover body 3 is formed of a plastics material which is preferably a rigid polyvinyl chloride.

Figure 2:
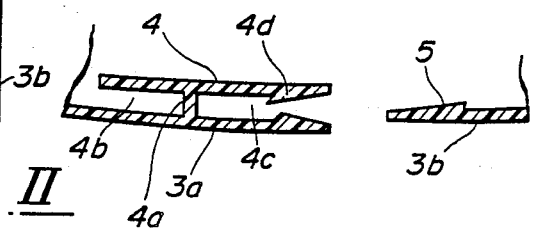
FIG. 2 is a fragmentary enlarged sectional view taken along line II—II of FIG. 1B.
Figure 6A:
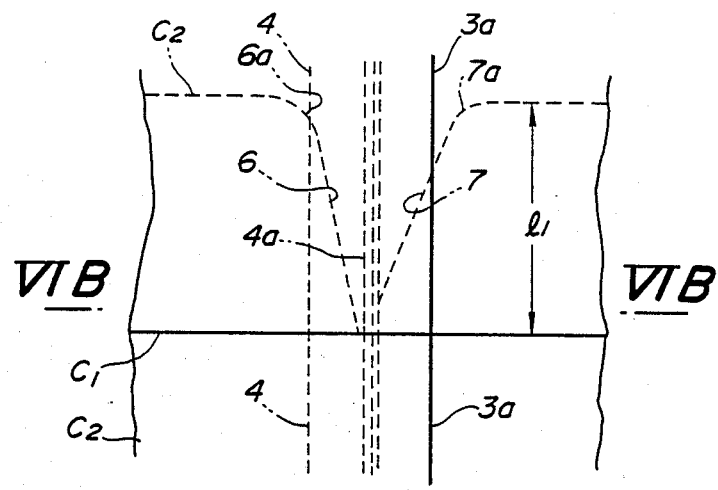
FIG. 6A is a fragmentary enlarged view showing the connection of FIG. 5 in greater detail.
Figure 6B:
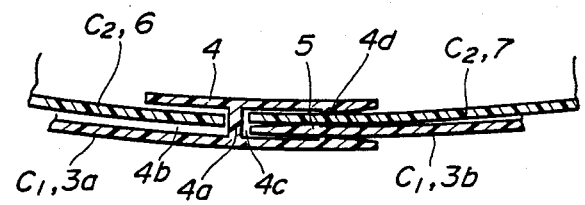

The cover body 3 has formed on an inner surface adjacent one side edge 3a, an integral rib 4 of a substantially T-shaped cross section which extends in the longitudinal direction of the cover body 3 as shown in FIG. 2. The T-shaped rib 4 is formed so as to have a leg portion 4a having one end connected to the inner surface of the cover body 3 and a wing portion mounted on the other end of the leg portion 4a so as to extend in both lateral directions therefrom. Thus, an inner groove 4b and an outer groove 4c extending in the longitudinal direction of the cover body 3 are formed between the rib 4 and the inner surface of the cover body 3 so as to be opposite to each other with the leg portion 4a of the T-shaped rib 4 located between them. The outer half of the wing portion of the T-shaped rib 4 forming the outer groove 4c is formed on the inner surface of its outer end with a first engagement projection 4d which, in the illustrated embodiment, comprises a hook-like projection.

Correspondingly, the other side edge 3b of the cover body 3 is formed on its inner surface with a second engagement projection 5, which also comprises a hook-like projection in the illustrated embodiment, so that the hook-like projections 4d and 5 are securely engaged with each other when the other side edge 3b of the cover body 3 is fitted in the outer groove 4d, to cause the cover body 3 to form a cylinder. This makes fitting the cover 3 on the covering material on a pipe a simple operation.

The cover body 3 may be formed from a plastics material as a thin or thick sheet of a predetermined length. A suitable thin or thick blank material may be formed as a continuous length by extrusion moulding of rigid polyvinyl chloride and then cut into pieces or sheets of a predetermined length (for example 1 m), using suitable means such as a knife, scissors or the like.

Figure 1B:
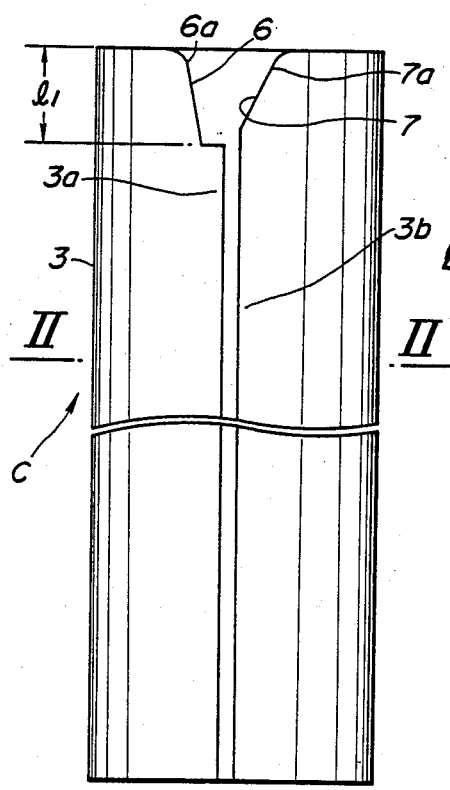
FIG. 1B is a front elevation of the plastics cover shown in FIG. 1A.

As shown in FIGS. 1 to 3, the cover body 3 is cut downwardly at the upper portion of the one side edge 3a through a predetermined distance $l_1$. The cut extends from a radius or curved portion 6a formed at the upper end of the edge 3a to an inner position of the rib 4a, so that a first engagement 6 is formed which serves both as a fitting guide and a rotation stop. In the illustrated embodiment, the one side edge 3a is somewhat obliquely cut. Correspondingly, the other side edge 3b of the cover body 3 is obliquely cut downwardly in its upper region by substantially the same distance $l_1$ from a radius or curved portion 7a at the upper end of the edge 3b as shown in FIG. 1B. Thus, a second engagement 7 is formed which serves both as a fitting guide and a rotation stop.

In the illustrated embodiment, the distance $l_1$ defines the extent of overlap between the adjacent covers when the upper end portion of a lower cover $C_2$ fittedly connected to the lower end portion of an upper adjacent cover $C_1$ through the engagements 6 and 7. When the adjacent covers $C_1$ and $C_2$ are connected together in this way, the first engagement 6 of the lower cover $C_2$ abuts against the leg portion 4a in the inner groove 4b of the upper cover $C_1$, as shown in FIGS. 4 to 7. At the same time the second engagement 7 of the lower cover $C_2$ abuts against the leg portion 4a in the outer groove 4c of the upper cover $C_1$. This results in any rotation of the covers $C_1$ and $C_2$ in relation to each other being effectively prevented. Also, this causes the one side edges 3a of the two connected covers to be "straightly aligned" with each other and to exhibit a good finished appearance.

The manner of fitting the plastics cover C onto an insulating covering material on a pipe will now be described.

First, the cover C is placed on the outside of the covering material 2 of a pipe 1 and the side edge 3b is located in the outer groove 4c of the one side edge 3a so that the second hook-like projection 5 engages the first hook-like projection 4d in the outer groove 4c, resulting in the cover being fixedly fitted in the pipe 1.

Next, a lower adjacent cover is located on the covering material on the pipe 1 as described above. The lower cover $C_2$ is then brought up to the upper cover $C_1$ while the upper end portion of the lower cover is contracted, as shown in FIG. 3. The curved portion 6a of the engagement 6 of the lower cover $C_2$ is inserted in the inner groove 4b of the upper cover $C_1$ and the curved portion 7a of the engagement 7 of the lower cover $C_1$ is inserted in the outer groove 4c of the upper cover $C_1$. This takes place smoothly because of the curved portion of each of the engagements 6 and 7.

Subsequently, the lower cover $C_2$ is pushed upwards so that it fits in the upper cover $C_1$ by the distance $l_1$. This fitting causes the corner of the lower end of the engagement 6 of the lower cover $C_2$ to abut against the leg portion 4a of the T-shaped rib 4 in the inner groove 4b of the upper cover $C_1$. At the same time, the engagement 7 of the lower cover $C_2$ abuts against the leg portion 4a of the T-shaped rib 4 in the outer groove 4c. This results in the engagements 6 and 7 of the lower cover $C_2$ effectively preventing rotation of the cover $C_2$ in both clockwise and counterclockwise directions in relation to the upper cover $C_1$, so that the side edges 3a of the upper and lower covers $C_2$ and $C_2$ are fixedly aligned with each other to form a single straight line.

As can be seen from the foregoing, the cover of the present invention is so constructed that the T-shaped rib on the one side of the cover body is formed with the first engagement projection in such a way that it will be positioned in the outer recess while the other side edge of the cover body is provided with the second engagement projection which engages the first engagement projection. Thus, secure mounting of the cover on a covering material of a pipe can be simply and readily carried out because only engagement between the two engagement projections is required. It has been found that the plastics cover of the present invention permits the time and cost required for the mounting operation to be decreased to a level one-third as much as those of the prior art, or below.

Also, in the present invention, the engagements 6 and 7 on the two side edges 3a and 3b of the cover body are each formed with a curved or radius portion in order to ensure smooth fitting between adjacent covers. Thus, connection between the two covers by fitting can be smoothly and readily carred out without any trouble as compared with the prior art, thereby facilitating the connecting operation and improving operation efficiency. This results in the connecting operation being relatively easy in a narrow place and/or in an awkward position.

Furthermore, the connection between adjacent covers by fitting causes the engagement 6 to abut against the rib 4a in the inner groove 4b and the engagement 7 to abut against the rib 4a in the outer groove 4c, in order to prevent relative rotation between the covers.

Accordingly, the one side edges 3a of the connected covers are kept straightly aligned with each other without being affected by external forces such as torsion or the like. Thus, the present invention provides the connected covers with a good finished appearance irrespective of the length of the connected covers.

Obviously, many modifications and variations of the present invention are possible in light of the above teachings. It is therefore to be understood that within the scope of the appended claims, the invention may be practiced otherwise than as specifically described.

What is claimed as new and desired to be secured by letters patent of the United States is:

1. A cover for piping comprising:
    a cover body made of a plastics material and having a wide strip-like shape when it is in a flattened or nonfolded configuration;
    a rib integrally extending along one side edge of the cover body in the longitudinal direction of the cover body, the rib comprising a leg portion which has one end integrally connected to the cover body and a wing portion mounted on the other end of the leg portion so as to extend laterally outwards from the leg portion, thereby defining an outer groove between the wing portion of the rib and the cover body;
    a first engagement means provided on the inner surface of the wing portion so as to be positioned in the outer groove; and
    a second engagement means provided on the outer surface of the other side edge of the cover body, the first and second engagement means being engageable whereby engagement between the first and second engagement means causes the cover body to form a cylinder; wherein the rib is substantially T-shaped in cross-section and the wing portion additionally extends laterally inward from the leg portion and is spaced from said cover body to define an inner groove such that the inner and outer grooves are opposite to each other with the leg portion interposed between them and defining means for engagement with an adjacent cover body.

2. A cover as defined in claim 1, wherein the cover body is formed by forming the plastics material into a continuous blank and cutting the blank into sheets of a predetermined length.

3. A cover for piping comprising:
    a cover body made of a plastics material and having a wide strip-like shape when it is in a flattened or nonfolded configuration;
    a rib integrally extending along one side edge of the cover body in the longitudinal direction of the cover body, the rib comprising a leg portion which has one end integrally connected to the cover body and a wing portion mounted on the other end of the leg portion so as to extend laterally outwards from the leg portion, thereby defining an outer groove between the wing portion of the rib and the cover body;
    a first engagement means provided on the inner surface of the wing portion so as to be positioned in the outer groove; and
    a second engagement means provided on the outer surface of the other side edge of the cover body, the first and second engagement means being engageable whereby engagement between the first and second engagement means causes the cover body to form a cylinder wherein the one side edge of the cover body is cut downwardly at its upper portion through a predetermined distance to an inner position of the rib to form a first engagement region serving as a fitting guide and a rotation stop, and the other side edge of the cover body is cut downwardly at its upper portion through the substantially the same distance to the side edge of the cover body to form a second engagement region serving as both a fitting guide and a rotation stop.

4. A cover as claimed in claim 3, wherein the cut at the one side edge and the cut at the other side edge each extend down from a respective curved portion.

* * * * *